F. W. YOST.
METHOD OF PREPARING FINELY DIVIDED METAL BEARING MATERIAL FOR SINTERING.
APPLICATION FILED FEB. 27, 1915.

1,263,832.

Patented Apr. 23, 1918.
3 SHEETS—SHEET 1.

WITNESSES

INVENTOR

F. W. YOST.
METHOD OF PREPARING FINELY DIVIDED METAL BEARING MATERIAL FOR SINTERING.
APPLICATION FILED FEB. 27, 1915.

1,263,832.

Patented Apr. 23, 1918.
3 SHEETS—SHEET 2.

WITNESSES

INVENTOR
F. W. Yost

F. W. YOST.
METHOD OF PREPARING FINELY DIVIDED METAL BEARING MATERIAL FOR SINTERING.
APPLICATION FILED FEB. 27, 1915.
1,263,832.
Patented Apr. 23, 1918.
3 SHEETS—SHEET 3.
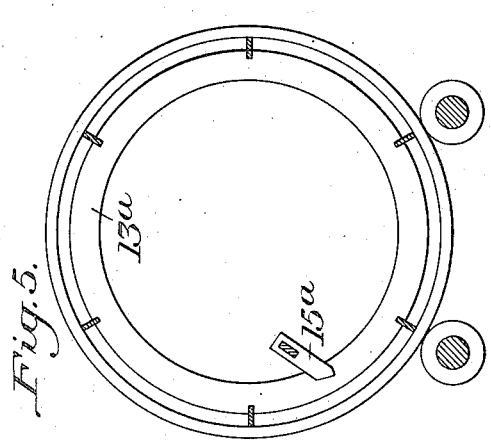
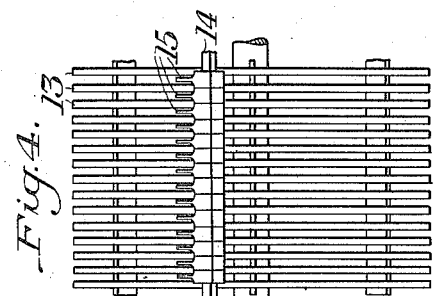
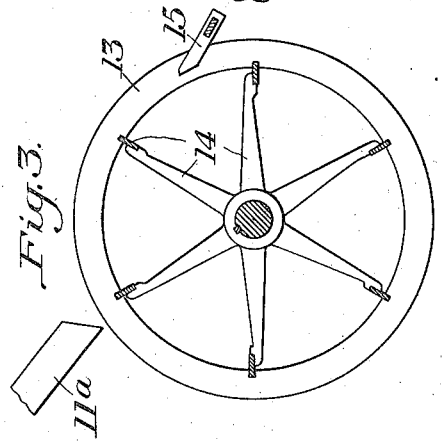
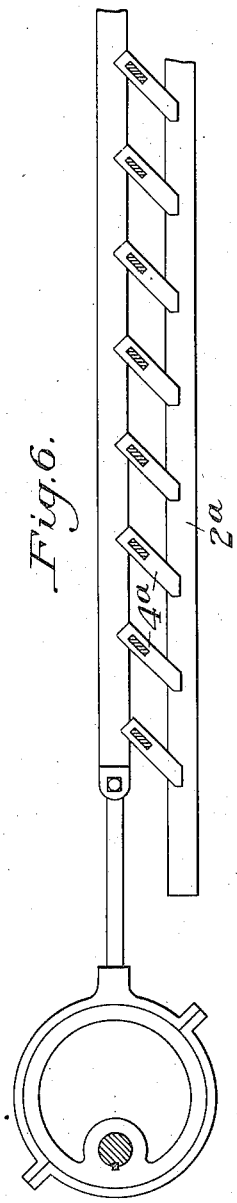
WITNESSES
INVENTOR

UNITED STATES PATENT OFFICE.

FREDERICK W. YOST, OF NEW YORK, N. Y., ASSIGNOR TO AMERICAN ORE RECLAMATION COMPANY, OF NEW YORK, N. Y., A CORPORATION OF NEW YORK.

METHOD OF PREPARING FINELY-DIVIDED METAL-BEARING MATERIAL FOR SINTERING.

1,263,832. Specification of Letters Patent. Patented Apr. 23, 1918.

Application filed February 27, 1915. Serial No. 10,927.

*To all whom it may concern:*

Be it known that I, FREDERICK W. YOST, a citizen of the United States, residing at New York, in the county of New York and State of New York, have invented a new and useful Improvement in the Methods of Preparing Finely - Divided Metal - Bearing Material for Sintering, of which the following is a full, clear, and exact description, reference being had to the accompanying drawings, forming part of this specification, in which:

Figs. 3 and 4 are diagrammatic views showing a modified form of rotary screen.

Fig. 5 is a view similar to Fig. 3, showing an internal form of rotary screen, and Figs. 6 and 7 are diagrammatic views showing modified forms of table screens.

My invention relates to the preparing of finely divided metal-bearing material for sintering. I have found that in the heat sintering of flue dust or finely divided ores, it is desirable that the material be screened in order to afford the proper sintering action. Flue dust contains pieces of coke of different sizes and as the material is taken from stock piles exposed to the atmosphere and elements, it is damp and sticky. The finely divided iron ore also contains lumps and is similarly taken from stock piles which are exposed to the atmosphere and are damp.

On account of the finely divided character of the major portion of such materials and their dampness, I have found it very difficult to properly screen the same, especially through openings less than one-half an inch in size. In order to produce proper sintering such screening is highly desirable, since lumps interfere with the uniformity of porosity of the material being sintered and hence makes the sintering ununiform. In this heat-agglomerating, nodulizing or sintering if lumps of coke are present above a certain size, these also interfere with the uniform sintering action and in addition cause a large excess of carbon. Flue dust normally contains more than the necessary carbon for sintering, aside from the larger lumps of coke.

After many attempts to carry out a screening operation upon these finely divided materials (*i. e.* metal-bearing materials of which the major portion is finely divided), I have found that I can accomplish this satisfactorily by the use of grizzly-bar screens provided with cleaning fingers.

If ordinary shaking or rotary screens are used, the damp material will clog up the holes and the lump material will be jammed in the holes soon stopping the operation. By the use of grizzly-bar screens and self-cleaning fingers, I have found that I can efficiently screen these materials to below one-half an inch.

Figure 1:
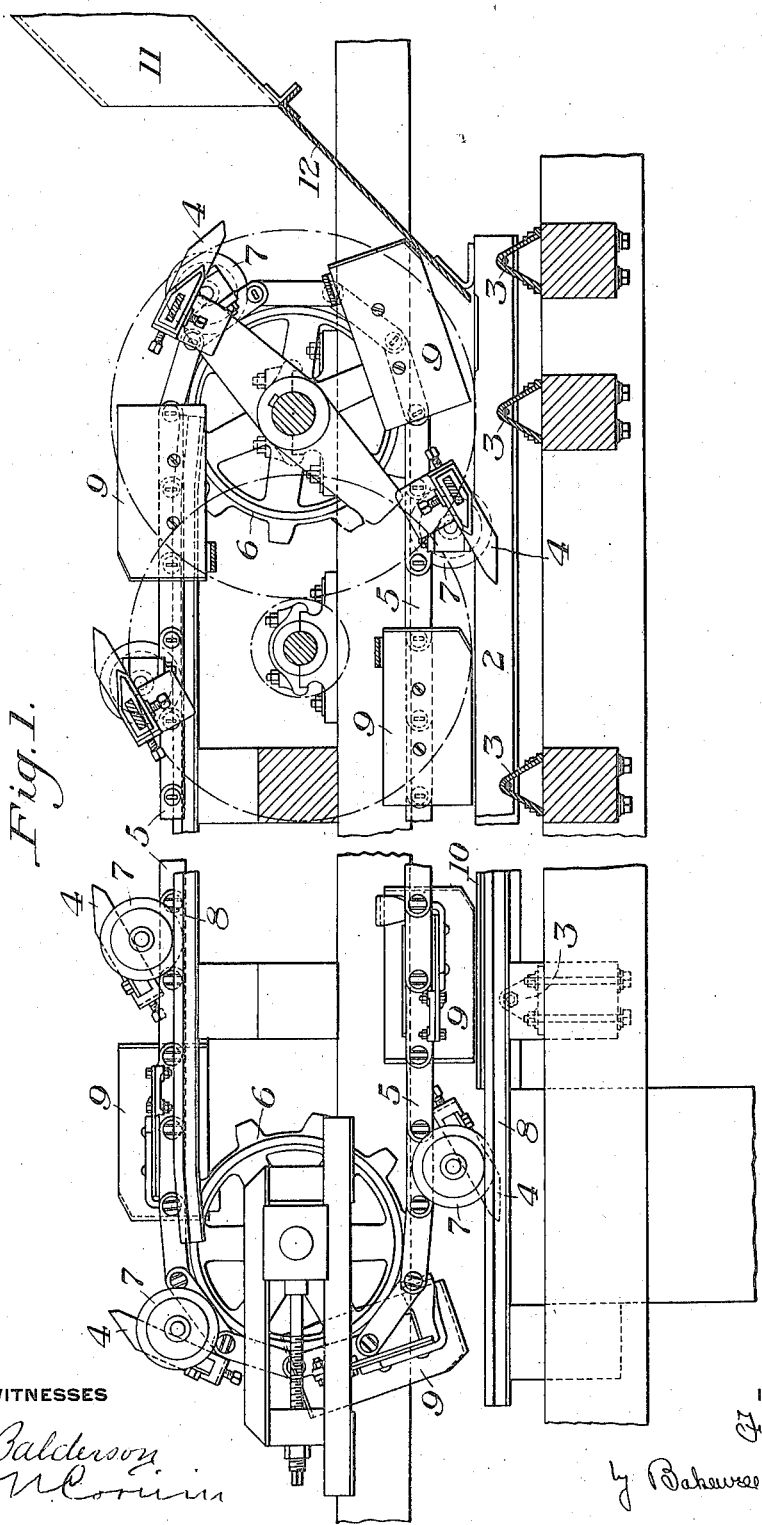
Figure 1 is a partial side elevation showing one form of apparatus for carrying out my invention.
Figure 2:
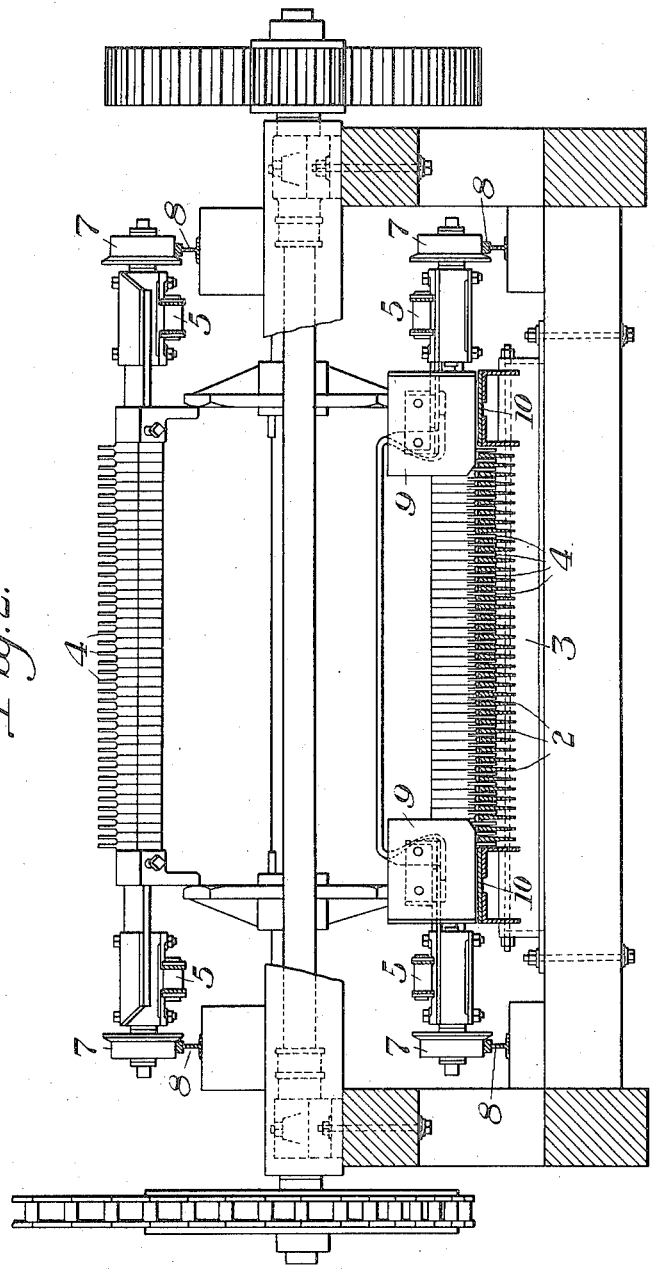
Fig. 2 is a cross section of the same.

In carrying out this screening step, prior to sintering, I may use any desirable type of grizzly-bar screen having self-cleaning fingers. For example, in the form of Figs. 1 and 2, 2 represents grizzly-bars carried on transverse supports 3, the bars extending above the supports to prevent interference with the cleaning fingers 4, which are secured to a pair of sprocket chains 5, traveling over end sprocket wheels 6, and adapted to move throughout the spaces between the grizzly-bars, these spaces being less than one-half an inch wide. The supporting side wheels 7 travel on suitable tracks 8, and I have shown the chains as provided with scrapers 9, which are adapted to push the material back on the screen from the dead plates 10 at each side thereof. Instead of these dead plates and pushers, trough sides may, of course, be employed. The material enters through the chute 11 over the feed plate 12, and the moving fingers and scrapers spread the material over the stationary screen and continuously clean the spaces thereof.

It will be noted that the cleaning fingers are inclined upwardly and rearwardly in plow form. This is of advantage, as it raises the material free from the screen and causes it to drop back thereon, thus assisting in the screening action. It will be noted that this raised material drops back on a clean portion of the screen through which the finer material may pass.

In Figs. 3 and 4, I show an external form of rotary grizzly-bar screen, the grizzly-bars being arranged as in the form of adjacent rings 13 secured to the internal framework 14. The fingers 15 are stationary and project from the outside in between the bars to clean the intervening spaces.

In Fig. 5 I show a form similar to that of Figs. 3 and 4, except that the material is introduced internally, the plows or cleaning fingers 15$^a$ being mounted on internal bars at the end of the perforated cylinder. In this case the material is introduced inside and drops outwardly between the grizzly-bars.

In Fig. 6 I show a form similar to that of Figs. 1 and 2 except that the cleaning fingers 4$^a$ are reciprocated between the grizzly-bars 2$^a$ by any suitable connection, such as the eccentric connection shown.

In Fig. 7 I show another form of table screen like that of Fig. 1, except that the fingers 4$^b$ are stationary and the bars 2$^b$ of the screen are reciprocated by any suitable connections.

In all of these forms the finely divided metal-bearing material is fed upon the grizzly-bars, the spaces between which are kept clear of all obstructions by the continuous cleaning action of the fingers movable relatively thereto. In this way such material may be rapidly and efficiently screened to remove all lumps of various sizes down to at least one-half an inch, thus properly preparing the material for the heat sintering operation.

Other forms of apparatus may be employed so long as the mechanical cleaning action is carried out, and other changes may be made without departing from my invention.

I claim:

1. The method of treating finely divided metal-bearing material containing an excess of fuel in lump form, which consists in screening the metal-bearing material and the finer fuel from the coarser fuel in the manner herein described, and in sintering the metal-bearing material, the finer fuel passing through the screen with the metal-bearing material furnishing the necessary carbon for sintering, substantially as set forth.

2. The method of treating finely divided damp metal-bearing material containing an excess of fuel in lump form, which consists in screening the metal-bearing material and the finer fuel from the coarser fuel while cleaning the screen openings in the manner herein described, and in sintering the metal-bearing material, the finer fuel passing through the screen with the metal-bearing material furnishing the necessary carbon for sintering, substantially as set forth.

3. The method of treating finely divided damp metal-bearing material containing an excess of fuel in lump form, which consists in screening the metal-bearing material and the finer fuel from the coarser fuel while passing cleaning fingers along the screen openings in the manner and for the purpose herein described, and in sintering the metal-bearing material, the finer fuel passing through the screen with the metal-bearing material furnishing the necessary carbon for sintering, substantially as set forth.

4. The method of treating finely divided damp metal-bearing material containing an excess of fuel in lump form, which consists in screening the metal-bearing material and the finer fuel from the fuel lumps down to at least a half inch in diameter while cleaning the screen openings in the manner herein described, and in sintering the metal-bearing material, the finer fuel passing through the screen with the metal-bearing material furnishing the necessary carbon for sintering, substantially as set forth.

In testimony whereof, I have hereunto set my hand.

FREDERICK W. YOST.

Witnesses:
W. B. WIDMAYER,
WALTER S. REED.